No. 782,717. Patented February 14, 1905.

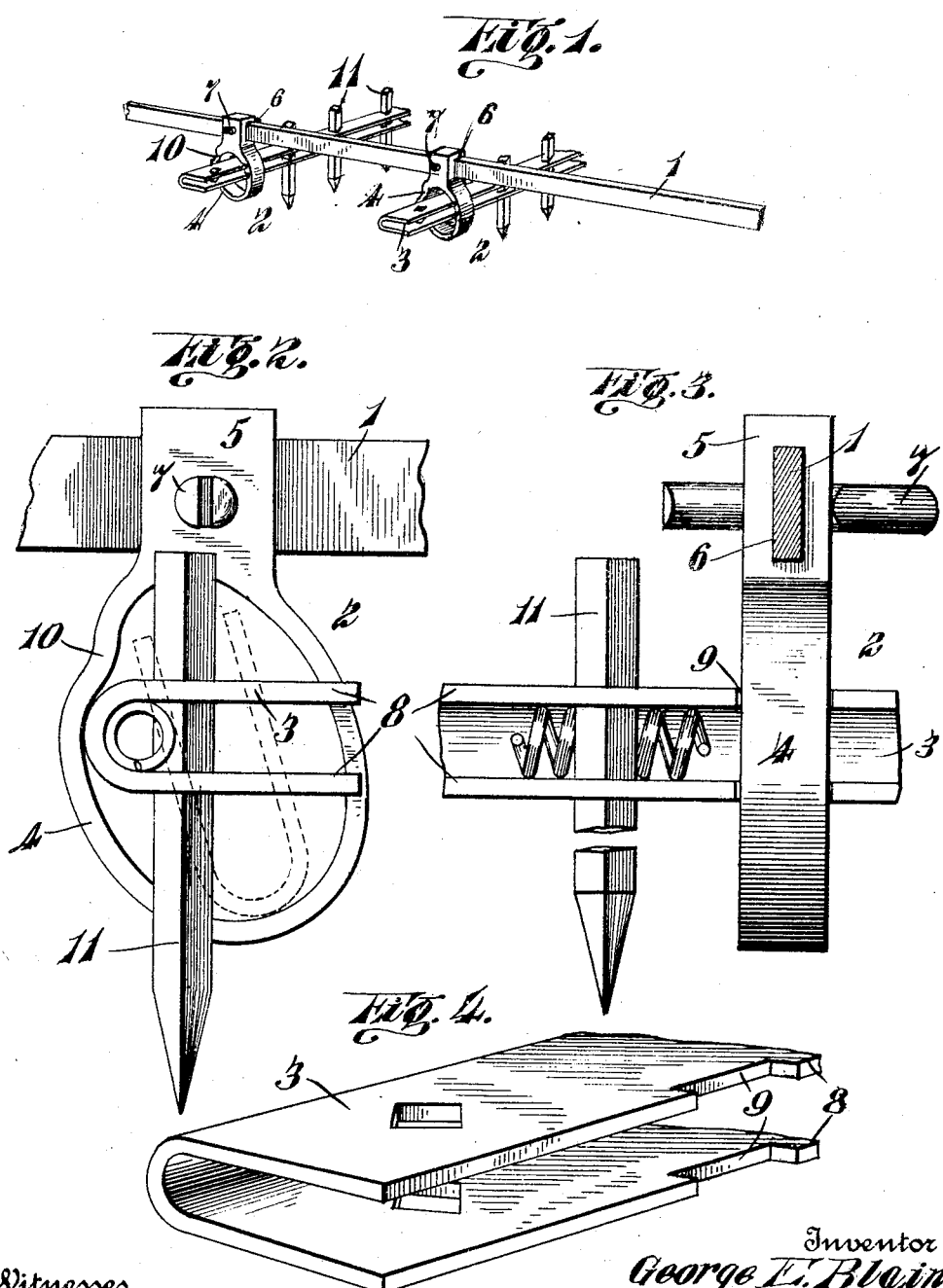

UNITED STATES PATENT OFFICE.

GEORGE E. BLAINE, OF PIQUA, OHIO, ASSIGNOR TO THE BLAINE HARROW MANUFACTURING COMPANY, OF PIQUA, OHIO.

COUPLING FOR HARROWS.

SPECIFICATION forming part of Letters Patent No. 782,717, dated February 14, 1905.

Application filed November 14, 1904. Serial No. 232,711.

*To all whom it may concern:*

Be it known that I, GEORGE E. BLAINE, a citizen of the United States, residing at Piqua, in the county of Miami and State of Ohio, have invented certain new and useful Improvements in Couplings for Harrows; and I do declare the following to be a full, clear, and exact description of the invention, such as will enable others skilled in the art to which it appertains to make and use the same.

My invention relates to improvements in harrows, and more particularly to the means for coupling the transverse tooth-bars of a harrow to the longitudinal connecting-bars.

The object of my invention is to improve and simplify the construction and operation of devices of this character, thereby rendering the same more efficient and durable in use and less expensive to manufacture.

With the above and other objects in view the invention consists of certain novel features of construction, combination, and arrangements of devices hereinafter described and claimed.

In the accompanying drawings, Figure 1 is a detail perspective view of a series of transverse tooth-bars of a harrow connected by a longitudinal connecting-bar in accordance with my invention. Fig. 2 is an end elevation of one of the coupling devices, the tooth-bar being in its normal position in full lines and in the position to which it is turned when it is desired to remove it from the coupling in dotted lines. Fig. 3 is a front elevation of the parts seen in Fig. 2; and Fig. 4 is a detail perspective view of a portion of one of the tooth-bars, showing the notches formed therein for the reception of the coupling-collar.

Referring to the drawings by numerals, 1 denotes the longitudinal connecting-bar of a harrow, to which is connected by means of a series of couplings 2 a series of transversely-disposed tooth-carrying bars 3. Each of the couplings 2 is in the form of a casting and consists of a collar 4, formed upon its top with an upwardly-projecting portion or lug 5, which is formed with a longitudinal slot or opening 6 to receive the bar 1. Said portion 5 of the coupling is secured upon the bar 1, preferably by means of a split pin or key 7, which is passed through alining openings formed in the sides of the lug 5 and the bar 1.

The tooth-bars 3 and the coupling 2, through which the former extend, are of such shape that the tooth-bars can only be passed or slid through the collars 4 when in a certain position, and after they have been inserted and turned axially the tooth-bars will be locked against endwise movement in the collars, but will be permitted to have a limited rotary or axial movement. As shown, the tooth-bar is in the form of a U-shaped channel-iron beam, which has formed in its flanges 8 alining notches 9, and the opening in the collar 4 is substantially elliptical in form, with its major axis disposed upwardly and rearwardly in an angular direction with respect to a vertical plane. Formed in the collar 4 on one of its sides slightly above its center is an inwardly-projecting portion 10, which is so disposed as to project slightly above the U-shaped tooth-bar when the latter is in its normal position, as shown by the full lines in Fig. 2 of the drawings, and thus prevents the same from being moved vertically in the collar. In inserting and removing the tooth-bar 3 from the collar 4 the former is turned to the position shown in dotted lines in said Fig. 2, so that its greater dimension or major axis alines with that of the opening in the collar. When in this position, the tooth-bar may be readily slipped longitudinally through said collar, and when the notches 9 in the tooth-bar aline with the collar said tooth-bar may be turned axially to the full-line position shown in Fig. 2, so that said notches engage said collar and prevent endwise movement of the tooth-bar in the same.

Harrow-teeth 11 of any desired form may be secured in the flanges of the tooth-bar 3 in any suitable manner and any suitable means (not shown) may be provided for rotating or adjusting the tooth-bar 3 angularly in the collar 4 in order to vary the angle of the teeth 11.

The construction, operation, and advantages of my invention will be readily seen upon reference to the drawings.

The tooth-bar 3 may be readily applied to or removed from the couplings and when in its normal position will be prevented from moving endwise in said couplings.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. A coupling of the character described comprising a casting consisting of a substantially elliptical collar adapted to receive a notched harrow-tooth bar, and a projecting portion or lug formed with a slot adapted to receive the longitudinal connecting-bar of a harrow, substantially as described.

2. The combination of a harrow-tooth bar formed with a notch, of a coupling comprising a collar having one of its interior dimensions greater than the other, whereby when said tooth-bar is slipped therein and turned so that its notch engages said collar, endwise movement of said tooth-bar in said coupling will be prevented, and means for attaching said collar to the longitudinal connecting-bar of a harrow, substantially as described.

3. The combination with a harrow-tooth bar, of unequal dimensions in cross-section and formed in one of its short faces with a notch, of a coupling comprising an irregularly-shaped collar having major and minor axes disposed angularly, whereby said tooth-bar will be retained in said collar after it has been inserted therein with their major axes in alinement and then turned to cause the notch in said tooth-bar to engage said collar, and means for connecting said collar to the longitudinal connecting-bar of a harrow, substantially as described.

4. The combination of a U-shaped channel-iron bar formed with alining notches in its flanges, of a coupling comprising a collar having one axis or dimension of its opening greater than the other and of sufficient size to permit of the insertion of said bar therein, whereby, when said tooth-bar has been thus inserted and turned axially to cause its notches to engage said collar, it will be held against endwise movement, and means for connecting said collar to the longitudinal bar of a harrow, substantially as described.

5. The combination of a U-shaped channel-iron bar formed with alining notches in its flanges, of a coupling comprising a collar having one axis or dimension of its opening greater than the other and of sufficient size to permit of the insertion of said bar therein, whereby, when said tooth-bar has been thus inserted and turned axially to cause its notches to engage said collar, it will be held against endwise movement, an inwardly-projecting portion in said collar adapted to prevent upward movement of said tooth-bar in said collar, and a slotted lug upon said collar for the reception of the longitudinal connecting-bar of a harrow, substantially as described.

In testimony whereof I have hereunto set my hand in presence of two subscribing witnesses.

GEORGE E. BLAINE.

Witnesses:
 J. A. SNYDER,
 EUGENE JOHNSON.